US010108697B1

(12) United States Patent
Poteet et al.

(10) Patent No.: US 10,108,697 B1
(45) Date of Patent: Oct. 23, 2018

(54) EVENT MATCHING BY ANALYSIS OF TEXT CHARACTERISTICS (E-MATCH)

(71) Applicant: The Boeing Company, Chicago, IL (US)

(72) Inventors: Steven R. Poteet, Bellevue, WA (US); Nigel Isaac Anthony Kilmer, Woodinville, WA (US); David Charles Augustine, Seattle, WA (US); Anne Shu-Wan Kao, Seattle, WA (US); Shan Luh, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 13/920,057

(22) Filed: Jun. 17, 2013

(51) Int. Cl.
G06F 17/30 (2006.01)
(52) U.S. Cl.
CPC .................. G06F 17/3061 (2013.01)
(58) Field of Classification Search
CPC ................................. G06F 17/30648
USPC ............................................. 707/748
See application file for complete search history.

(56) References Cited

U.S. PATENT DOCUMENTS

| 7,403,932 | B2 | 7/2008 | Kao et al. | |
|---|---|---|---|---|
| 2002/0103799 | A1* | 8/2002 | Bradford et al. | 707/6 |
| 2007/0106499 | A1* | 5/2007 | Dahlgren | G06F 17/30401 704/10 |
| 2007/0118506 | A1* | 5/2007 | Kao et al. | 707/3 |
| 2008/0109454 | A1* | 5/2008 | Willse | G06F 17/30616 |
| 2008/0141117 | A1* | 6/2008 | King | G06F 17/30011 715/238 |
| 2009/0281906 | A1* | 11/2009 | Cai et al. | 705/26 |
| 2010/0005386 | A1* | 1/2010 | Verma et al. | 715/237 |
| 2010/0100817 | A1* | 4/2010 | Trotter | G06F 17/2229 715/261 |
| 2011/0047168 | A1* | 2/2011 | Ellingsworth | 707/749 |
| 2012/0185478 | A1* | 7/2012 | Topham | G06F 17/30616 707/737 |
| 2012/0221324 | A1* | 8/2012 | Machii | G06F 17/2785 704/9 |
| 2012/0323738 | A1* | 12/2012 | Gokturk et al. | 705/26.63 |

(Continued)

OTHER PUBLICATIONS

Becker et al, Learning Similarity Metrics for Event Identification in Social Media, Feb. 4-6, Copyright 2010 ACM, 10 pages.*

(Continued)

Primary Examiner — Loc Tran
(74) Attorney, Agent, or Firm — McDonnell Boehnen Hulbert & Berghoff LLP

(57) ABSTRACT

A system and method for event matching by analysis of text characteristics are presented. A document collection comprising documents is acquired. One or more document subsets of the document collection each comprising one or more documents potentially describing identical events are identified based on certain structured metadata fields of the documents. Salient text features are extracted from the documents in the document collection. An event similarity score for pairs of documents in the document collection is generated by comparing the text features extracted from the documents. A common event document list comprising sets of documents in the document collection whose event similarity scores with each other are above a similarity threshold is generated.

22 Claims, 3 Drawing Sheets

(56) References Cited

U.S. PATENT DOCUMENTS

2013/0006611 A1* 1/2013 Brdiczka ............. G06F 17/2705
　　　　　　　　　　　　　　　　　　　704/9
2014/0089020 A1* 3/2014 Murphy ........................... 705/5

OTHER PUBLICATIONS

Kumaran et al, "Text Classification and Named Entities for New Event Detection", SIGIR' 04, Jul. 25-29, 2004, 8 pages.*

* cited by examiner

FIG. 1

106  108  110
ODE event at 2pm on March 17 2010 due to rain is canceled.
112  102  114
OUTDOORS EVENT AT 2 AFTERNOON ON MARCH 17 2010 IS CANCELED DUE TO RAIN FORECAST
104
116
100

LOCAL NEWS JOURNAL

News Service 09/20/04

(Reuters) --Technology giant A and work together on developing ground military communications and homela an estimated $200 billion market, 204
B, the world's largest technology co supplier to the U.S. military, have fo on digital communications and infor and future Department of Tech and partnership has not yet signed any 206

BUSINESS JOURNAL

Company A and B announce 10-year partnership
Business Journal 09/20/04  208

A and B announce 10-year partnership

The A Co. and B Corp. are teaming up to develop various technologies for the Department of Tech and intelligence systems, the companies said Monday. 210
The two companies announced plans in a Monday news conference to work together on four programs in the intelligence area and four programs with Department of Tech. 212
The companies said the estimated market for the systems is about $200 million. 214

Financial terms were not disclosed.

The 10-year agreement calls for B to provide A with information management services and other computer technology to help A provide its government customers with network-centric operations.
216

202  204

EVENT MATCHING BY ANALYSIS OF TEXT CHARACTERISTICS (E-MATCH)

FIELD

Embodiments of the present disclosure relate generally to documents contents assessment systems, and more particularly relate to electronic event matching by analysis of unstructured text features in a document.

BACKGROUND

It is difficult and time consuming for a reader to read through similar texts and manually identify different texts that refer to the same event.

SUMMARY

A system and method for event matching by analysis of text characteristics is presented. A document collection comprising documents is acquired. To improve speed, document subsets of the document collection comprising documents potentially describing identical events may be identified based on structured metadata fields of the documents. Salient text features are extracted from the documents in the document collection. Certain text features may be normalized by converting them to a standard form so that they are comparable. An event similarity score for subsets of documents in the document collection is generated by comparing the text features extracted from the documents. A common event document list is generated comprising sets of documents whose event similarity scores with each other are above a similarity threshold.

In this manner, embodiments examine a collection of documents which are on similar topics, and automatically identify important similarities between documents in the collection.

In a first embodiment, a method for event matching by analysis of text characteristics acquires a document collection comprising a plurality of documents. The method then identifies one or more document subsets of the document collection, each comprising one or more documents potentially describing identical events based on certain structured metadata fields of the documents. The method further extracts salient text features from the documents in the document collection. The method then generates an event similarity score for pairs of documents in the document collection by comparing the salient text features extracted from the documents. The method further generates a common event document list comprising sets of documents in the document collection whose event similarity scores with each other are above a similarity threshold.

In a second embodiment, a system for event matching by analysis of text characteristics comprises, a web crawler module, a text feature extraction module, an initial document grouping module, a similarity scoring module, and a similar document list module. The web crawler module is configured to acquire a document collection comprising a plurality of documents. The initial document grouping module is configured to identify one or more document subsets of the document collection, each comprising one or more documents that potentially describe the same event based on structured metadata fields of the documents. The text feature extraction module is configured to extract salient text features from each document in the document collection. The similarity scoring module is configured to generate an event similarity score for pairs of documents in the document collection by comparing the text features extracted from the documents. The similar document list module is configured to generate a common event document list comprising sets of documents in the document collection whose event similarity scores with each other are above a similarity threshold.

In a third embodiment, a non-transitory computer readable storage medium comprises computer-executable instructions for event matching by analysis of text characteristics. The computer-executable instructions acquire a document collection comprising a plurality of documents. The computer-executable instructions further identify one or more document subsets of the document collection, each comprising one or more documents potentially describing identical events based on certain structured metadata fields of the documents. The computer-executable instructions further extract salient text features from the documents in the document collection. The computer-executable instructions further generate an event similarity score for pairs of documents in the document collection by comparing the text features extracted from the documents. The computer-executable instructions further generate a common event document list comprising sets of documents in the document collection whose event similarity scores with each other are above a similarity threshold.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 1 is an illustration of two reports of the same event indicating how a human reader may identify some text features that help her/him determine the two reports are about the same event, despite a different expression of those features.

FIG. 2 is an illustration of documents showing actual differences in details in different reports of the same news story.

DETAILED DESCRIPTION

Figure 3:
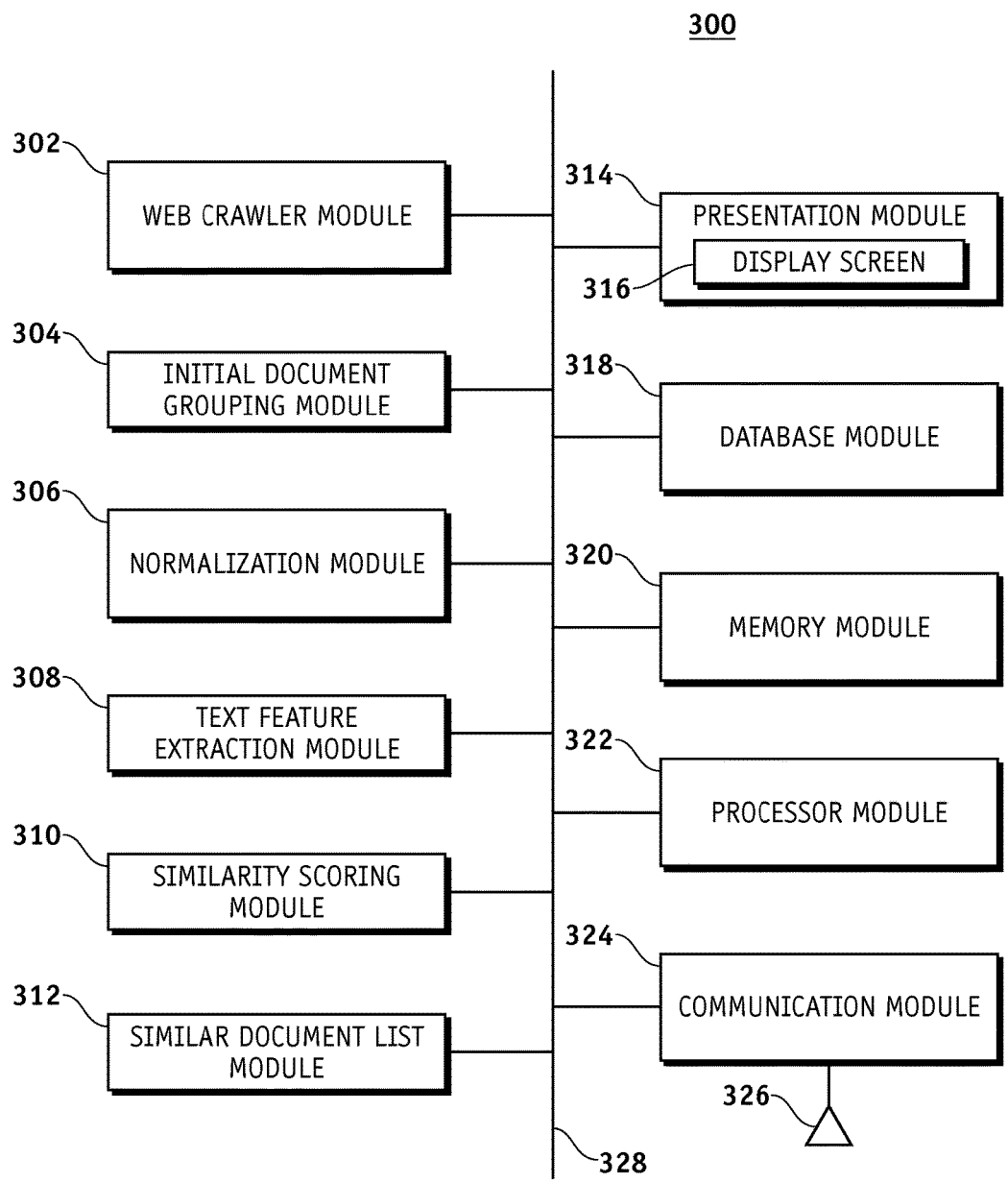
FIG. 3 is an illustration of exemplary functional block diagram of an event matching by analysis of text characteristics system according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, event matching based on multi-word terms (phrases) and numbers and alphanumeric strings. Embodiments of the disclosure, however, are not limited to the text features described herein, and the embodiments may also be utilized in other applications. For example, embodiments may be applicable to graphical characters such as language characters, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A method according to the embodiments examines a collection of documents which describe similar events, and automatically identifies which documents most likely describe the same event. The documents/data generally come from multiple data sources, written with diverse terminology. The method automatically extracts and stores salient text attributes/features in each document, and may normalize identified features as appropriate. Not all features can be normalized, e.g., arbitrary alphanumeric identifiers and multi-word terms may not be amenable to normalization, unless one starts with a list of possible values for these. The method then compares the documents and scores their similarity based on these features. The results can be examined by a subject matter expert for disposition, or automatically resolved by a software tool realized in a non-transitory computer media and stored, for example, in a database.

Data from multiple sources may comprise different reports describing or referring to the same event. In other examples, reports describing the same event may comprise important differences that a user would wish to identify. For example, a search engine news may provide multiple entries for a same news event from different sources as shown in FIG. 2. It is hard for users to read through these different sources manually and identify significant differences. For example, a team that studies aviation safety is interested in counting the occurrences of a certain type of event, but different sources may contain duplicate reports of the same event. Sometimes even the same source may contain duplicate reports of the same event. For example, different versions of the same story from the same new agency or an anonymous, self-reporting aviation event system that may have different reports of the same event from different people. Manually sorting out duplicates can be very time consuming, and with diversity in terminology use and in writing style, it is very challenging for a non-automated tool to accomplish these tasks.

Existing methods generally are not concerned with a specific event, but rather are concerned with identifying subtle differences in stories already known or assumed to be related. Existing methods generally require an ontology of entity types and an entity extractor to find the differences and to allow a user to fine-tune what types of differences they are interested in (e.g., what types of entities such as an organization, money amounts, etc.).

In contrast, embodiments identify which stories are about the same event. Further in contrast to the existing solutions, embodiments utilize one or more of the following features: (1) multi-word terms or phrases; (2) numbers and alphanumeric patterns; (3) single-word terms that satisfy some measure of rarity or uniqueness like inverse document frequency (IDF).

FIG. 1 is an illustration of two reports 102 and 104 of the same event indicating how a human reader may identify some text features that help her/him determine the two reports are about the same event, despite a different expression of those features. For example, a human reader may identify, "ODE" 106 with "OUTDOORS EVENT" 112, "2 pm" 108 with "2 AFTERNOON" 114, and "rain" 110 with "RAIN" 116.

FIG. 2 is an illustration of documents showing actual differences in details in different reports of the same news story. News story 202 is the same as news story 204 but comprises in part the following differences:

"$200 billion" 204 in the news story 202 vs. "$200 million" 214 in the news story 204.

"10-year" 208 in the news story 204 is not shown in the news story 202.

The news story 202 does not contain "four programs" 212 shown in the news story 204.

Department of tech 206 in the news story 202 is shown in different context than department of tech 210 in the news story 204.

Network-centric operations 216 in the news story 204 is not shown in the news story 202.

It may be difficult for a reader to quickly read through a large number of similar texts such as the news story 202 and the news story 204 and manually identify 1) which stories are really about the same event; and 2) for those texts that are about the same event, what details are the same and what details are different.

FIG. 3 is an illustration of exemplary functional block diagram of an event matching by analysis of text characteristics system (E-MATCH system 300) according to an embodiment of the disclosure. The E-MATCH system 300 may comprise: a web crawler module 302, an initial document grouping module 304, a normalization module 306, a text feature extraction module 308, a similarity scoring module 310, a similar document list module 312, a presentation module 314, a database module 318, a memory module 320, a processor module 322, and a communication module 324.

A collection of documents or reports (which may be determined in a number of ways, comprising a set of sources or a keyword or metadata search) is first grouped into subsets using metadata. Then salient text features, such as phrases and numerical expressions, are extracted from a free text and may be normalized. Reports are then compared based on these features, where the comparison score may be just a raw number of matches or some more complicated combination of feature comparison scores such as a Jaccard similarity coefficient (Jaccard measure of similarity) or a cosine similarity (cosine measure of similarity) possibly involving differential weighting of features, using various methods, such as inverse document frequency (IDF). The Jaccard similarity coefficient, the cosine similarity, and the IDF may be used by any method known in the art.

Reports that have been determined to be most likely about the same event based on their match scores being above a certain threshold are either stored in the memory module 320 for later use or displayed to the users, listing or highlighting matching and mismatching features, for their analysis. Display of the features can help the users quickly determine whether a match is correct or not, what features are different in the two reports even when they are about the same event, and even allow them to recognize features as matching when the system did not (i.e., add to a synonym or acronym list).

Metadata is a term of the art that may refer to "data about data". For example, metadata may comprise well structured content fields comprising information that may be used to narrow down sets of records or documents that might refer to a same event. For example, metadata may comprise, without limitation, time, location, or other salient entities or entity types (e.g., airplane models) that can speed up the process of comparison (e.g., using database functionality on values that don't need any normalization). Furthermore, metadata may comprise, without limitation, structural metadata, descriptive metadata, or other type of metadata.

Structural metadata may refer to design and specification of data structures such as data about containers of data. Descriptive metadata may refer to individual instances of application data such as data content, "data about data content", "content about content" and metacontent. Metadata may be used to describe data using standards specific to a particular discipline. If a document is not grouped with other documents based on metadata fields, it may not be necessary to extract text features, which potentially could save time.

The web crawler module 302 is configured to acquire a document collection comprising a plurality of documents. The web crawler module 302 may gather the document collection from an electronic resource using for example but without limitation, a set of sources, a keyword, a metadata search, or other criteria. Two or more of the documents with similar topics are then examined to identify their important differences and how likely they are about the same event or type of event as explained below. The electronic resource may comprise, for example but without limitation, free text fields in a local or remote database, a locally stored electronic document, a remotely accessible electronic document, an interactive on-line Internet cloud-computing document service, a local or remote document management system, or other electronic resource.

The initial document grouping module 304 is configured to identify one or more document subsets of the document collection, each subset comprising documents that describe potentially identical events based on structured metadata fields of the salient text features from each document in the document collection, for example all the documents with the same time. The structured metadata fields may comprise, for example but without limitation, time, location, airplane model, entities or entity types characteristic of the events in question, or other relevant event attributes.

These metadata features, however, even if available, are often not enough to reliably identify two reports as referring to the same event. In order to do that, additional features from the free text are needed. Two general categories of such features are phrases or multi-word terms, especially phrases describing "things" in a broadest sense (e.g., including organizations and processes, as well as objects like parts and equipment), and numerical expressions. Unlike single words, these tend to be fairly uniquely associated with events, especially when two or more words are shared by two or more reports. They also have the advantage of not requiring an extensive knowledge base in order to identify them, and are thus domain independent.

The text feature extraction module 308 is configured to extract salient text features (if present) from documents in the document collection. In order to assist users, what is needed is to find features that are characteristic of a particular event and are relatively easy for a computer to find. The salient text features may comprise for example but without limitation, phrases or multi-word terms, numbers, alphanumerical expressions, or other features, since these features tend to be characteristic of a particular event and are relatively easy for a computer to find.

Some documents may not contain any relevant text features, which means such documents would not be able to be compared with other documents. Also, as noted above, text features may not need to be extracted from all the documents, if they have already been excluded from combination with other documents based on metadata.

These text features may be stored in the database module 318 and be available at run-time of the E-MATCH system 300 for further analysis when needed. New data may be processed as it arrives or in a batch. The multi-word terms may comprise, for example but without limitation, "takeoff roll", "took corrective action", "landing gear", or other multi-word term. The alphanumeric strings may comprise pure numbers, numbers with units, or alphanumeric identifiers, such as, for example but without limitation, "1,324", "150 knt", "200 nm", "100 deg", "nos. 1,2,3", "#1", "cfm56-3-b1", "b-737", or other number. Other, automatically extracted multi-word terms may comprise, for example but without limitation, "apu and wheel well warnings", "crew heard a pop and a seat moved", "weather warning presented", or other multi-word term.

There are various ways of extracting multi-word terms automatically. One method is by identifying N-grams, sequences of words that occur more frequently than is likely given the occurrence of the individual words in the sequence. These can be of various lengths ("N"), typically 2-5 words. Other methods may also be used.

Numerical expressions can come in a variety of flavors. Several types of the numerical expressions are especially useful in describing events: pure number, number plus unit, alphanumeric expressions (e.g., as IDs for documents, equipment, organizations, etc.), and expressions of the form "No. 1" and its variants. Typically, regular expressions are used to extract these features.

A regular expression is a term of art that may refer to a formal language description often called a pattern. A regular expression may comprise an expression that specifies a set of strings, and rules are used to specify members of the set of strings. Additional description of regular expressions can be found in the Internet, or a formal language, formal grammars, and/or computational linguistics text book.

Whether phrases or numerical expressions, these features often have minor variations that have to be taken into account when comparing them. With phrases, they can differ in one or two words, especially non-content words like "of" or "the" while still referring to the same thing (e.g., "snow sticks to the aircraft" vs. "snow on the aircraft"), or they can involve misspellings or alternate spellings of the same word (e.g., "airplane returned to blocks" vs. "airplane returned to blocs"). Some of this can be handled automatically with various fuzzy matching algorithms. Others can be handled with synonym or acronym lists (e.g., "rejected takeoff" vs. "RTO").

Terms can be either exactly matched or "fuzzily" matched between records such as, for example but without limitation, "aircraft came to a halt" can be matched to "aircraft came to a stop", "airplane returned to blocks" can be matched to "airplane returned to blocs", "snow sticks to the aircraft" can be matched "snow on the aircraft", or other match.

Numerical expressions can comprise variations such as a pure number differing by a small amount (e.g., "11" vs. "12") or one source rounding a number and another not. Number plus units can vary in a number of ways (e.g., "150 KNOTS" vs. "150 kts"), with the unit abbreviated (in various ways) or not or with a space separating the number and the unit. Alphanumeric expressions often have "0" (zero) and capital "O" or "1" (one) and lower case "L" or upper case "I" reversed or may involve other typos. These can all be solved fairly automatically with limited or no knowledge bases (synonyms and acronyms being an exception), using numerical distance or regular expressions to normalize these, or a fuzzy match algorithm to match alphanumeric expressions with non-systematic typos.

The normalization module 306 is operable to convert different variations of certain types of text feature into a standard form typically using regular expressions. In this manner, the normalization module 306 is configured to normalize certain text features by converting them to a standard form so that they are comparable. In some embodiments the normalization module 306 may be combined with the text feature extraction module 308. In this case normalization and text feature extraction may be performed concurrently. In some configurations normalization may be performed before text feature extraction. For example, acronym expansion and synonym replacement may precede extraction of multiword terms/phrases.

General non-normalized alphanumeric patterns may comprise, for example but without limitation, "26R", "FL240", "34-12-01", or other alphanumeric pattern.

Examples of normalized number and unit patterns may comprise, without limitation, the following:

"110 kts", "110 kt", "110 knts", "110 knots" all into "110_knots";

"700 k", "700 kilos", "700 kgs" all into "700_kilograms";

"26 volt", "26v" both into "26_volts"; and

"180 degree", "180 deg" both into "180_degrees".

Examples of normalized number X (Y, Z)+alphabet patterns may comprise, without limitation, the following:

"#1", "nr 1", "no. 1" all into "#1";

"nbr 1 and 2", "nr 1 and 2", "nr 1 & 2" all into "#1 and #2";

"nbr 1, 2, 5 and 6" all into "#1, #2, #5, and #6"; and

"nos. 3 through 6" into "#3, #4, #5, and #6".

Capturing longer alphanumeric patterns like number plus unit instead of only pure numbers typically improves precision (out of all of the items the system identified, how many are correct), by distinguishing "100 kts" and "100 kgs". Normalized number-unit tokens: "100_kts" and "100_kgs" correctly, do not match. Alphanumeric tokens for these as pure numbers would be "100" and "100", i.e., they would mistakenly match.

The following are examples of how the normalization module 306 improves recall (out of all correct answers, how many did the system identify):

Example 1

"100 knots", "100 kts" and "100 knts" will be normalized as "100_kts". Without the normalization module 306, alphanumeric tokens for these would be "100" (or "100 knots"), "100 kts" and "100 knts", respectively, and would not match.

Example 2

"Num 1", "nbr. 1" and "#1" will be normalized as "#1". Without normalization module 306, alphanumeric tokens for these would be "1", "1", and "#1", respectively, and only first two would match.

The similarity scoring module 310 is operable to generate an event similarity score for pairs of documents in the document collection by comparing the text features extracted from the documents. For example, the event similarity score for two documents may be the number of features that match or it may be a more complicated combination of feature comparison scores possibly involving differential weighting of features, and comparison using various methods. For example, an event similarity score may include weighting of the salient text features for each pair of the pairs of documents based on a rarity measure. The salient text features may include single word terms that satisfy the rarity measure. In some embodiments, the rarity measure may comprise an inverse document frequency (IDF).

The similar document list module 312 is operable to generate a common event document list comprising sets of documents in the document collection whose event similarity scores with each other are above a similarity threshold. The similarity threshold, may comprise for example but without limitation, sharing at least two text features in common or having a weighted comparison score above some figure depending on the scoring method used. The threshold can be set by the user based on their application and data or can be adjusted based on feedback from the user (e.g., their confirmation or disconfirmation of certain suggested groupings of documents).

The presentation module 314 is operable to present the common event document list, matching text features, non-matching text features, or a combination thereof to a user. The common event document list may comprise likely duplicated documents identified, a similarity score, important similar features and differences. System 300 can incorporate user feedback, and use machine learning to improve future results.

The presentation module 314 may comprise a display screen 316. The display screen 316 may use a technology, such as, but without limitation, a liquid crystal display (LCD), an organic electro-luminescence (OEL), an organic light emitting diode (OLED), an organic electro luminescent device (OELD), an electronic ink, and the like. Various kinds of information can be displayed on the display screen 316 via an image/video signal supplied from a processor module 322. The presentation module 314 may also comprise user input means (not shown) to receive user input (a key pad, a touchpad, a voice input, etc.). The user input/feedback may be processed at the processor module 322 to improve the future results.

The database module 318 may be configured to store, maintain, and provide data as needed to support the functionality of the E-MATCH system 300 in the manner described below. For example, the database module 318 is configured to store the common event document list in a non-transitory storage medium. The database module 318 may comprise a lookup table for purposes of storing the data. Moreover, the database module 318 may be, for example but without limitation, a local database locally coupled to the processor module 322, a remote database such as a central network database remotely coupled to processor module, other storage source, or a combination thereof. The database module 318 may be comprised in the memory module 320.

The memory module 320, may be realized as a non-volatile storage device (non-volatile semiconductor memory, hard disk device, optical disk device, and the like), a random access storage device (for example, SRAM, DRAM), or any other form of storage medium known in the art. The memory module 320 may be coupled to the processor module 322 that can read information from, and write information to the memory module 320. The memory module 320 may store, for example but without limitation, the common event document list, the matching text features, the non-matching text features, the user feedback, a synonym list, an acronym list, salient text features, and/or other parameters.

The processor module 322 can control overall operation of the E-MATCH system 300. For example, the processor module 322 may control operations of the E-MATCH system 300 so that processes of the E-MATCH system 300 are suitably performed. Processes of the E-MATCH system 300 may be suitably performed such that various processes are performed by proper procedures in response to an input from a user or automatically.

These processes may comprise, for example but without limitation, directing the web crawler module 302 to acquire the document collection, directing the text feature extraction module 308 to extract the salient text features, directing the initial document grouping module 304 to identify one or more document subsets of the document collection, directing the normalization module 306 to generate one or more normalized text feature subsets, and other functions as explained above. The processor module 322 may also control a communication of the communication module 324. For another example, the processor module 322 may control the display screen 316 to display the common event document list.

The processor module 322, may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or other software or hardware machines.

A processor may also be implemented as a combination of computing devices, e.g., a combination of a digital signal processor and a microprocessor, a plurality of microprocessors, one or more microprocessors in conjunction with a digital signal processor core, or any other such configuration. The processor module 322 comprises processing logic that is configured to carry out the functions, techniques, and processing tasks associated with the operation of the E-MATCH system 300.

In particular, the processing logic is configured to support the method of the E-MATCH system 300 described herein. Furthermore, the steps of a method or algorithm described in connection with the embodiments disclosed herein may be embodied directly in hardware, in firmware, in a software module executed by the processor module 322 or in any combination thereof.

As an example, the processor module 322 and memory module 320 may reside in their respective ASICs. The memory module 320 may also be integrated into the processor module 322. In an embodiment, the memory module 320 may include a cache memory for storing temporary variables or other intermediate information during execution of instructions to be executed by the processor module 322.

The memory module 320 may also include non-volatile memory for storing instructions to be executed by the processor module 322.

The communication module 324 is operable to transmit and receive a plurality of communication signals comprising data signals via a transceiver (not shown) under control of the processor module 322. The communication module 324 operates with an antenna 326 to carry out a radio communication with a network side device via a base station communicatively coupled to a wireless communication network (not shown).

The communication module 324 can transmit a signal from the processor module 322 as a transmitted radio signal to a base station through the antenna 326, and can demodulate a received radio signal received from the base station through the antenna 326. The processor module 322 receives a demodulated signal form the communication module 324.

The communication module 324 may also comprise an Ethernet/USB communication module (not shown) configured to provide communication between the E-MATCH system 300 and the electronic resources via Ethernet. The Ethernet/USB communication module communicates with the Internet through an access port to download documents, and to interact with Web-based services.

The various illustrative blocks, modules, processing logic, and circuits described in connection with the E-MATCH system 300 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated E-MATCH system 300 depicts a simple embodiment for ease of description. These and other elements of the E-MATCH system 300 are interconnected together, allowing communication between the various elements of the E-MATCH system 300. In one embodiment, these and other elements of the E-MATCH system 300 may be interconnected together via a data communication bus 328.

Figure 4:
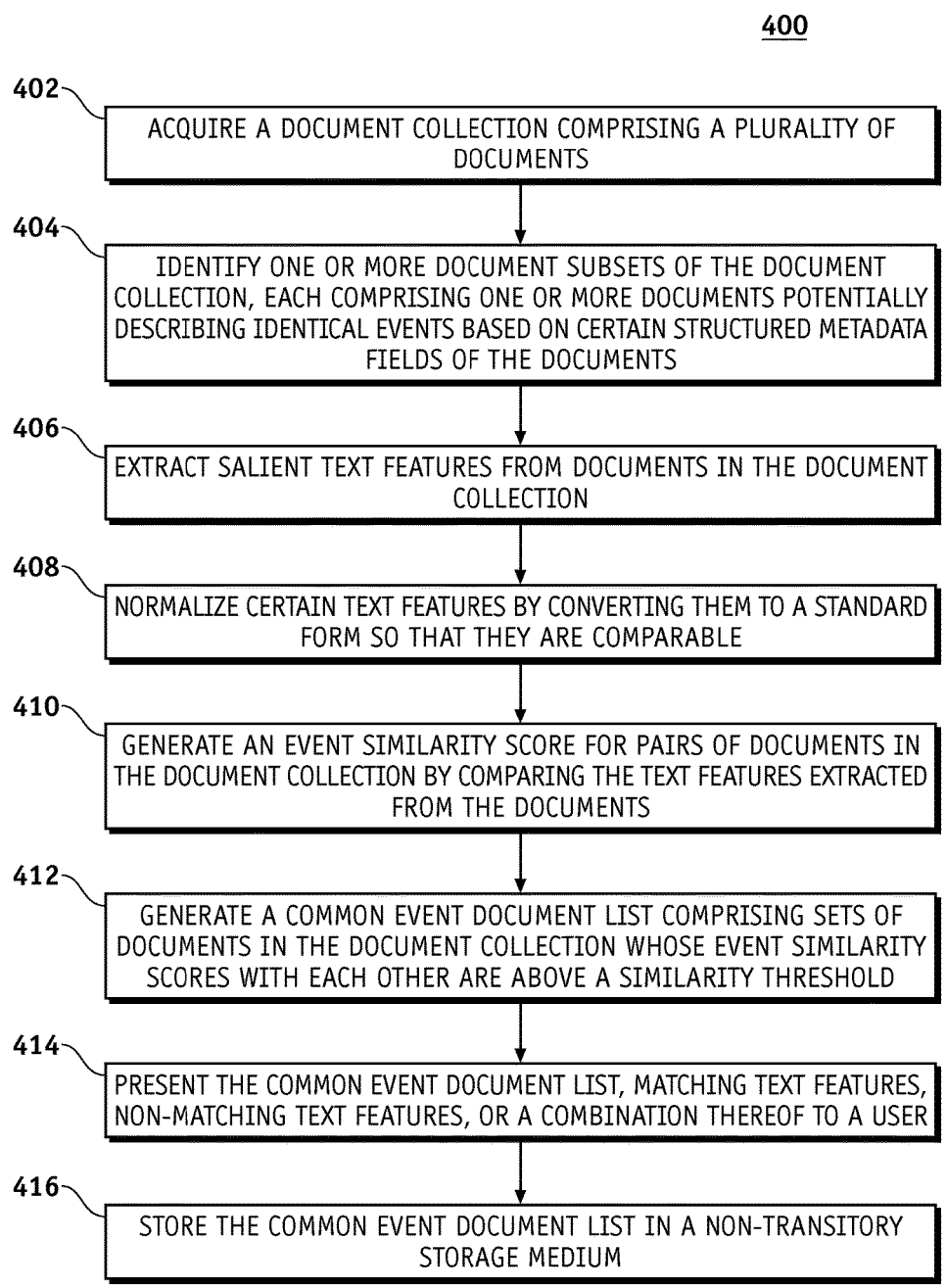
FIG. 4 is an illustration of a flowchart showing an exemplary process for event matching by analysis of text characteristics according to an embodiment of the disclosure.

FIG. 4 is an illustration of a flowchart showing an exemplary process 400 for event matching by analysis of text characteristics according to an embodiment of the disclosure. The various tasks performed in connection with process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. For illustrative purposes, the following description of process 400 may refer to elements mentioned above in connection with FIG. 2.

In some embodiments, portions of process 400 may be performed by different elements of the E-MATCH system 300 for event matching by analysis of text characteristics such as: the web crawler module 302, the initial documents grouping module 304, the text feature extraction module 308, the normalization module 306, a similarity scoring module 310, the similar document list module 312, the presentation module 314, the database module 318, the memory module 320, the processor module 322, the communication module 324, etc. Process 400 may have functions, material, and structures that are similar to the embodiments shown in FIG. 2. Therefore common features, functions, and elements may not be redundantly described here.

Process 400 may begin by the web crawler module 302 acquiring a document collection comprising a plurality of documents (task 402).

Process 400 may, as an optional step, continue by the initial document grouping module 304 identifying one or more document subsets of the document collection, each comprising one or more documents potentially describing identical events based on certain structured metadata fields of the documents (task 404).

Process 400 may continue by the text feature extraction module 308 extracting salient text features from documents in the document collection (task 406).

Process 400 may, as an optional step, continue by the normalization module 306 normalizing certain text features by converting them to a standard form so that they are comparable (task 408).

Process 400 may continue by the similarity scoring module 310 generating an event similarity score for pairs of documents in the document collection by comparing the text features extracted from the documents (task 410).

Process 400 may continue by the similar document list module 312 generating a common event document list comprising sets of documents in the document collection whose event similarity scores with each other are above a similarity threshold (task 412).

Process 400 may continue by the presentation module 314 presenting the common event document list, matching text features, non-matching text features, or a combination thereof to a user (task 414).

Process 400 may continue by the memory module 320 storing the common event document list in a non-transitory storage medium (task 416).

In this way, a system and a method are provided for event matching by analysis of text characteristics in electronic documents.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 322 to cause the processor module 322 to perform specified operations. Such instructions, generally referred to as "computer program code" or "program code" (e.g., which may be grouped in the form of computer programs or other groupings), when executed, enable the language mapping method of the E-MATCH system 300.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments.

It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 3 depicts example arrangements of elements, additional intervening elements, devices, features, or components may be present in an embodiment of the disclosure.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A method for event matching by analysis of text characteristics, the method comprising:
   acquiring a document collection comprising a plurality of documents;
   identifying one or more document subsets of the document collection, each comprising one or more documents, based on one or more structured metadata fields of the documents comprising one or more structured content fields such that two or more documents describing an identical event are grouped in a same document subset, wherein the one or more structured content fields comprise one or more structured content fields for an airplane model, time, location, and one or more entities associated with the event;

determining whether a document in a particular document subset of the one or more document subsets is excluded from combination with other documents in the particular document subset based on the one or more structured metadata fields;

after determining that the document in the particular document subset is excluded from combination with other documents in the particular document subset, determining to avoid extracting text features from the document;

otherwise, extracting one or more salient text features from documents in the particular document subset by at least:

extracting a particular multi-word text feature based on determining that a sequence of words of the particular multi-word text feature occurs relatively frequently given occurrence of individual words in the sequence of words of the particular multi-word text feature, wherein the particular multi-word text feature comprises an aircraft event associated with one of aircraft takeoff, aircraft landing, corrective action, aircraft speed, weather, crew observations, or aircraft subsystem;

determining one or more normalized text features of an aircraft event by at least:

converting one or more variations of at least one salient text feature of the one or more salient text features to a standard form using one or more regular expressions, and converting one or more variations of at least one salient text feature of the one or more salient text features to a standard form using numerical distance and normalizing alphanumeric patterns including numbers and units of measure;

generating an event similarity score for pairs of documents in at least the particular document subset by comparing the one or more normalized text features extracted from the documents in the particular document subset, wherein the event similarity score comprises a weighting of the one or more normalized text features for each pair of the pairs of documents based on a rarity measure measuring word rarity; and generating a common event document list comprising sets of documents in the document collection whose event similarity scores with each other are above a similarity threshold for each pair of documents.

2. The method of claim 1, wherein the one or more salient text features comprise one or more numbers or alphanumeric expressions.

3. The method of claim 1, wherein extracting the one or more salient text features further comprises handling one or more non-content words within the particular multi-word text feature.

4. The method of claim 1, wherein determining one or more normalized text features comprises replacing a particular salient text feature with a synonym of the particular salient text feature.

5. The method of claim 1, wherein extracting the one or more salient text features comprises extracting a salient text feature comprising one or more single word terms that satisfy the rarity measure.

6. The method of claim 1, wherein the event similarity score for pairs of documents comprises a Jaccard or cosine measure of similarity of the one or more normalized text features.

7. The method of claim 1, further comprising presenting the common event document list, matching text features, non-matching text features, or a combination thereof.

8. The method of claim 1, further comprising storing the common event document list in a non-transitory storage medium.

9. The method of claim 1, wherein comparing the one or more normalized text features comprises comparing the one or more normalized text features using a fuzzy match algorithm.

10. A system for event matching by analysis of text characteristics, the system comprising:

a processor;

a web crawler module coupled to the processor and operable to acquire a document collection comprising a plurality of documents;

an initial document grouping module coupled to the processor and operable to identify one or more document subsets of the document collection, each comprising one or more documents, based on one or more structured metadata fields of the documents comprising one or more structured content fields such that two or more documents describing an identical event are grouped in a same document subset, wherein the one or more structured content fields comprise one or more structured content fields an airplane model, time, location, and one or more entities associated with the event;

a text feature extraction module coupled to the processor and operable to extract one or more salient text features by at least:

determining whether a document in a particular document subset of the one or more document subsets is excluded from combination with other documents in the particular document subset based on the one or more structured metadata fields;

after determining that the document in the particular document subset is excluded from combination with other documents in the particular document subset, determining to avoid extracting text features from the document;

otherwise, extracting one or more salient text features from documents in the particular document subset by at least:

extracting a particular multi-word text feature based on determining that a sequence of words of the particular multi-word text feature occurs relatively frequently given occurrence of individual words in the sequence of words of the particular multi-word text feature, wherein the particular multi-word text feature comprises an aircraft event associated with one of aircraft takeoff, aircraft landing, corrective action, aircraft speed, weather, crew observations, or aircraft subsystem;

a normalization module coupled to the processor and operable to determine one or more normalized text features of an aircraft event by at least:

converting one or more variations of at least one salient text feature of the one or more salient text features to a standard form using one or more regular expressions, and converting one or more variations of at least one salient text feature of the one or more salient text features to a standard form using numerical distance and normalizing alphanumeric patterns including numbers and units of measure;

a similarity scoring module coupled to the processor and operable to generate an event similarity score for pairs of documents in at least the particular document subset by comparing the one or more normalized text features extracted from the documents in the particular document subset, wherein the event similarity score comprises a weighting of the one or more normalized text features for each pair of the pairs of documents based on a rarity measure measuring word rarity; and a similar document list module coupled to the processor and operable to generate a common event document list comprising sets of documents in the document collection whose event similarity scores with each other are above a similarity threshold for each pair of documents.

11. The system of claim 10, wherein the one or more salient text features comprise one or more numbers or alphanumeric expressions.

12. The system of claim 10, wherein the one or more salient text features comprise one or more multi-word text features that include the particular multi-word text feature.

13. The system of claim 10, wherein comparing the one or more normalized text features comprises comparing the one or more normalized text features using a fuzzy match algorithm.

14. The system of claim 10, wherein the normalization module is operable to determine the one or more normalized text features by replacing a particular salient text feature with a synonym of the particular salient text feature.

15. The system of claim 10, further comprising a non-transitory storage medium operable to store the common event document list in the non-transitory storage medium.

16. The system of claim 10, further comprising a presentation module coupled to the processor and operable to present the common event document list, matching text features, non-matching text features, or a combination thereof.

17. A non-transitory computer readable storage medium comprising computer-executable instructions for event matching by analysis of text characteristics, such that, when the computer-executable instructions are executed by a processor of a system, the system performs functions comprising:

acquiring a document collection comprising a plurality of documents;

identifying one or more document subsets of the document collection, each comprising one or more documents, based on one or more structured metadata fields of the documents comprising one or more structured content fields such that two or more documents describing an identical event are grouped in a same document subset, wherein the one or more structured content fields comprise one or more structured content fields for an airplane model, time, location, and one or more entities associated with the event;

determining whether a document in a particular document subset of the one or more document subsets is excluded from combination with other documents in the particular document subset based on the one or more structured metadata fields;

after determining that the document in the particular document subset is excluded from combination with other documents in the particular document subset, determining to avoid extracting text features from the document;

otherwise, extracting one or more salient text features from documents in the particular document subset by at least:

extracting a particular multi-word text feature based on determining that a sequence of words of the particular multi-word text feature occurs relatively frequently given occurrence of individual words in the sequence of words of the particular multi-word text feature, wherein the particular multi-word text feature comprises an aircraft event associated with one of aircraft takeoff, aircraft landing, corrective action, aircraft speed, weather, crew observations, or aircraft subsystem;

determining one or more normalized text features by at least:

converting one or more variations of at least one salient text feature of the one or more salient text features to a standard form using one or more regular expressions, and converting one or more variations of at least one salient text feature of the one or more salient text features to a standard form using numerical distance and normalizing alphanumeric patterns including numbers and units of measure;

generating an event similarity score for pairs of documents in at least the particular document subset by comparing the one or more normalized text features extracted from the documents in the particular document subset, wherein the event similarity score comprises a weighting of the one or more normalized text features for each pair of the pairs of documents based on a rarity measure measuring word rarity; and generating a common event document list comprising sets of documents in the document collection whose event similarity scores with each other are above a similarity threshold for each pair of documents.

18. The non-transitory computer readable storage medium of claim 17, wherein the one or more salient text features comprise one or more multi-word text features that include the particular multi-word text feature.

19. The method of claim 1, wherein extracting the one or more salient text features comprises extracting the one or more salient text features only from the documents grouped in the same document subset.

20. The non-transitory computer readable storage medium of claim 17, wherein extracting the one or more salient text features comprises extracting the one or more salient text features only from the documents grouped in the same document subset.

21. The method of claim 7, wherein presenting the common event document list comprises presenting a display of the common event document list, that highlights one or more mismatching text features in the common event document list and highlights one or more matching text features in the common event document list.

22. The method of claim 7, further comprising:

receiving feedback about the presented common event document list, the feedback regarding confirmation or disconfirmation about a grouping of documents in the common event document list; and adjusting the similarity threshold based on the feedback about the presented common event document list.

* * * * *

UNITED STATES PATENT AND TRADEMARK OFFICE
CERTIFICATE OF CORRECTION

PATENT NO.          : 10,108,697 B1
APPLICATION NO.     : 13/920057
DATED               : October 23, 2018
INVENTOR(S)         : Stephen R. Poteet et al.

It is certified that error appears in the above-identified patent and that said Letters Patent is hereby corrected as shown below:

On the Title Page

Under (72) Inventors: please delete "Steven" and insert -- Stephen -- before "R. Poteet".

Signed and Sealed this
Eighteenth Day of June, 2019

Andrei Iancu
*Director of the United States Patent and Trademark Office*